F. W. WOYCHINSKE, A. PAPOUSCHEK & L. LENNIG.

SASH LOCK.

No. 11,603. Reissued May 25, 1897.

WITNESSES

C. Nordfors

C. Gerst

INVENTORS

Frank H. Woychinske
Anton Papouschek
Louis Lennig

BY

Edgar Tate & Co.

ATTORNEYS

THE NORRIS PETERS CO., PHOTO-LITHO., WASHINGTON, D. C.

UNITED STATES PATENT OFFICE.

FRANK WILLIAM WOYCHINSKE, ANTON PAPOUSCHEK, AND LOUIS LENNIG, OF NEW YORK, N. Y.

SASH-LOCK.

SPECIFICATION forming part of Reissued Letters Patent No. 11,603, dated May 25, 1897.

Original No. 564,814, dated July 28, 1896. Application for reissue filed March 9, 1897. Serial No. 626,680.

*To all whom it may concern:*

Be it known that we, FRANK WILLIAM WOYCHINSKE, ANTON PAPOUSCHEK, and LOUIS LENNIG, citizens of the United States, and residents of New York city, in the county of New York and State of New York, have invented certain new and useful Improvements in Locks or Fastening Devices for Windows, of which the following is a specification, reference being had to the accompanying drawings, forming a part thereof, in which similar letters of reference indicate corresponding parts.

This invention relates to locks or fastening devices for window-sashes; and the object thereof is to provide an improved article of this class which is adapted to be connected with the frame of a window about midway of the side thereof and to operate in connection with both the upper and the lower sashes; and said improvement comprises two ratchet-wheels, which are mounted in line with each other, and one of which is adapted to operate in connection with a rack-bar formed on or secured to the lower sash and the other of which is adapted to operate in connection with a similar rack-bar formed on or secured to the upper sash; and with this and other objects in view the invention consists in the construction, combination, and arrangement of parts hereinafter described and claimed.

The invention is fully disclosed in the following specification, of which the accompanying drawings form a part, in which—

Figure 1:
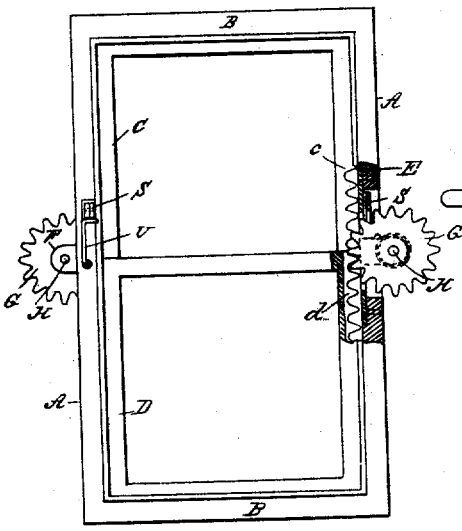
Figure 2:
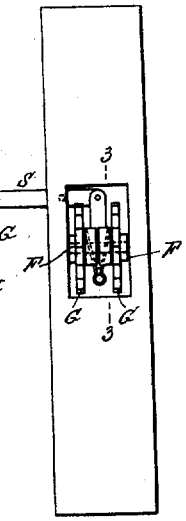
Figure 3:
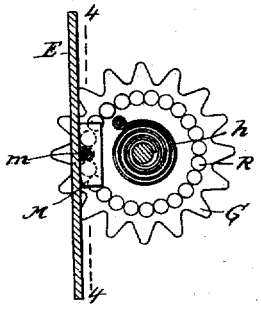

Figure 1 is a front view of a window-frame having the usual upper and lower sashes mounted therein and provided with our improved lock or fastening device, one of which is arranged on both sides of the window; Fig. 2, a side view thereof; Fig. 3, a section on the line 3 3 of Fig. 2, and Fig. 4 a section on the line 4 4 of Fig. 3.

In the drawings forming part of this specification we employ an ordinary window-frame composed of the side pieces A and top and bottom pieces B, and within this frame is mounted the usual upper and lower sashes C and D. The ordinary sides of the sashes C and D are provided with rack-bars *c* and *d*, respectively, and these rack-bars may be formed integrally with the sashes or independently thereof and be secured thereto.

Secured to the inner surface of the sides A of the window-frame are plates E, and connected therewith are outwardly-directed jaws F, between which are mounted two similar ratchet-wheels G, one of which is adapted to operate in connection with the rack-bar on the upper sash and the other in connection with the rack-bar on the lower sash. These ratchet-wheels are each mounted on a shaft H, and mounted on the inner side of each of said wheels is a spring *h*, one end of which is secured to said shaft and the other end to the adjacent wheel.

Secured to or formed on the plate E, adjacent to the inner side of each wheel, are two shoulders or projections M, which are preferably slightly wedge-shaped in form, the smaller end thereof being directed upwardly, and each of which is provided centrally with an opening *m*, and secured to the plate E, below the shoulders or projections M, is a two-sided spring O, the ends of which project upwardly between said shoulders or projections, and secured to or formed on said ends of said spring, and on the outer sides thereof, are outwardly-directed pins P, which are adapted to pass through the openings *m* in the shoulders or projections M and to engage with circular cavities or recesses R, formed in the inner surfaces of the ratchet-wheels G.

Figure 4:
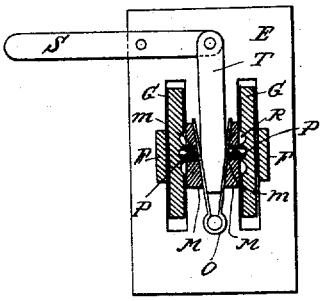

The cavities or recesses R are arranged in a circle on the inner surface of each of the ratchet-wheels, as clearly shown in Fig. 3, and pivotally connected with the plate E and projecting outwardly is a lever S, the inner end of which is pivotally connected with a depending rod or bar T, the lower end of which is wedge-shaped and adapted to fit between the ends of the spring O, as clearly shown in Fig. 4.

The operation will be readily understood from the foregoing description when taken in connection with the accompanying drawings.

When the lever S is raised to a horizontal position, the rod or bar F is depressed and the pins P are forced outwardly, so as to engage with the cavities or recesses R in the inner surface of the ratchet-wheels, and neither sash can be raised or lowered, or, in other words, both sashes will be locked in position, and whenever it is necessary or desirable to raise the lower sash or lower the upper sash, or to perform both of these operations, the projecting end of the lever S must be depressed, and in this operation the rod or bar F will be raised and the ratchet-wheels G will turn, and the sashes may be operated as above described.

In raising the sashes, which must be done by hand, the springs *h* are unwound, and when said sashes are lowered they are wound up, and the operation of these springs is to assist in raising the sashes when the pressure of the pins P is withdrawn from the ratchet-wheels G.

We also employ a pivoted arm U, which is adapted to hold the lever S in position, so as to lock the sashes and the ratchet-wheels G, as will be readily understood; but any desired form of device may be used for this purpose, and though we have shown our improved lock as connected with each side of the window-frame this arrangement is not absolutely necessary, and in the case of small windows or light sashes a single locking device constructed as herein shown and described and applied to one side of the window will suffice. We prefer, however, to employ our improved lock or fastening device on both sides of the window, and especially so in the case of large and heavy sashes, and for the reason that this form of construction insures a more even and regular action and prevents the twisting and wedging of the sashes.

Our invention is not limited to the exact form, construction, and arrangement of parts herein shown and described, and we therefore reserve the right to make all such alterations therein and modifications thereof as fairly come within the scope of the invention.

Having fully described our invention, we claim as new and desire to secure by Letters Patent—

The combination with the frame of a window of a lock or fastening device for the sashes thereof, comprising two ratchet-wheels mounted on the same shaft, one of which is adapted to operate in connection with a rack-bar on the upper sash, and the other with a similar rack-bar on the lower sash, said ratchet-wheels being free to revolve when the sashes are raised or lowered, and a pivoted lever which projects outwardly and is provided at its inner end with a rod or bar, and devices operating in connection therewith for locking said ratchet-wheels, comprising spring-operated pins, which are adapted to be forced outwardly by said rod or bar, and into cavities or recesses formed in the inner surfaces of said ratchet-wheels, substantially as shown and described.

In testimony that we claim the foregoing as our invention we have signed our names, in presence of the subscribing witnesses, this 23d day of February, 1897.

FRANK WILLIAM WOYCHINSKE.
ANTON PAPOUSCHEK.
LOUIS LENNIG.

Witnesses:
NICHOLAS SCHMITT,
CONRAD NESTLER.